United States Patent [19]
Lee

[11] Patent Number: 5,505,281
[45] Date of Patent: Apr. 9, 1996

[54] CYLINDER WITH REMOTE CONTROL RESISTANCE

[76] Inventor: W. Ken Lee, 3531 Princeton Corners La., Marietta, Ga. 30062

[21] Appl. No.: 407,669

[22] Filed: Mar. 21, 1995

Related U.S. Application Data

[62] Division of Ser. No. 237,203, May 3, 1994, abandoned.

[51] Int. Cl.⁶ ........................................ F16F 9/46
[52] U.S. Cl. .................. 188/299; 188/319; 188/322.15
[58] Field of Search ................... 188/299, 300, 188/318, 319, 322.15, 322.22, 314; 280/707, 714

[56] References Cited

U.S. PATENT DOCUMENTS

| | | |
|---|---|---|
| 1,205,433 | 11/1916 | Christman . |
| 2,426,447 | 8/1947 | Gladden et al. . |
| 2,788,842 | 4/1957 | Ohlenkamp . |
| 2,825,427 | 3/1958 | Steibel . |
| 2,836,264 | 5/1958 | Groen . |
| 3,192,816 | 7/1965 | Zimmerman ..................... 188/314 |
| 3,363,518 | 1/1968 | Boissevain . |
| 3,477,550 | 11/1969 | Suzuki et al. . |
| 4,036,335 | 7/1977 | Thompson et al. ................. 188/314 |
| 4,183,509 | 1/1980 | Nishikawa et al. . |
| 4,236,613 | 12/1980 | Van Der Lely ..................... 188/318 X |
| 4,579,199 | 4/1986 | Nakayama et al. ................ 188/314 X |
| 4,796,732 | 1/1989 | Kong . |
| 4,805,900 | 2/1989 | Sapp . |
| 4,838,394 | 6/1989 | Lemme et al. . |
| 4,919,418 | 4/1990 | Miller . |
| 5,064,031 | 11/1991 | Kakizaki . |
| 5,078,241 | 1/1992 | Ackermann et al. . |
| 5,097,857 | 3/1992 | Mayhew . |
| 5,100,166 | 3/1992 | Mitsui ................................ 188/267 X |
| 5,135,251 | 8/1992 | Wormann . |
| 5,172,794 | 12/1992 | Ward . |
| 5,178,160 | 1/1993 | Gracovetsky et al. . |
| 5,183,449 | 2/1993 | DeCloux . |
| 5,207,300 | 5/1993 | Engel et al. . |
| 5,207,621 | 5/1993 | Koch et al. . |
| 5,320,375 | 6/1994 | Reeves et al. ...................... 188/319 X |

*Primary Examiner*—Robert J. Oberleitner
*Assistant Examiner*—Lee W. Young
*Attorney, Agent, or Firm*—Richard C. Litman

[57] ABSTRACT

A hydraulic control system provides various internal mechanisms for the control of the internal resistance of the telescoping cylinders of the system. Various devices and principles are provided for the external or remote adjustment of the internal resistance control mechanisms of the cylinders. In addition, various types of readouts are provided in order to determine the internal working condition(s) of the cylinder(s). Fluid systems (hydraulic or pneumatic) are provided for the determination of the working condition and internal resistance adjustment of a single cylinder, and further for such determination and adjustment of plural cylinders either collectively or independently. The system is particularly adaptable to use with exercise machines of various types, allowing the user of such a machine to adjust the internal resistance of the cylinder, and to determine the amount of work being expended due to the readout of the internal working condition of the cylinder. The system is also adaptable to individual or collective control of plural shock absorbers, as in a vehicle suspension system, and to the individual or collective readout of the working condition of such shock absorbers.

12 Claims, 4 Drawing Sheets

FIG. 8A

CYLINDER WITH REMOTE CONTROL RESISTANCE

REFERENCE TO RELATED PATENT APPLICATION

This is a divisional patent application of U.S. patent application Ser. No. 08/237,203 filed on May 3, 1994, now abandoned.

FIELD OF THE INVENTION

The present invention relates generally to hydraulic and/or pneumatic devices, and more specifically to a system utilizing one or more telescoping hydraulic control cylinders and a compression and rebound control system therefor. The system may also provide output information relating to the settings of the cylinder(s) and the resulting fluid resistance therein.

BACKGROUND OF THE INVENTION

Telescoping hydraulic and/or pneumatic cylinders have long been used for the control of various mechanisms, from devices as simple as screen door closures to automobiles and other relatively complex machines. More recently, such telescoping cylinders have been adapted to various types of exercise machines and devices, to supplant weights, springs, etc. commonly used in such devices.

While purely mechanical devices generally provide for ease of adjustment, e.g., by adding or removing weights, hydraulic or pneumatic cylinders generally fail to provide adjustment means, unless additional complexity (and cost) is built into the system. Even when such adjustment is provided, the user must generally stop the exercise program and adjust the unit directly, which procedure detracts from a continuous exercise program. Moreover, generally no means is provided for the user to measure or quantify the resistance of such units, as no means for readout is usually provided. This can be a problem particularly for those suffering from injuries or the like, and requiring a strictly controlled exercise program.

The need arises for a hydraulic/pneumatic system adaptable to exercise devices and the like, which system provides for the adjustment of the compression and/or rebound resistance of the telescoping units. The system should preferably provide for remote adjustment, so that a user need not move to the location of the units to make an adjustment thereof. Moreover, the system should provide for the output of the settings and/or resistance of the hydraulic units, thus enabling a user to determine the exact amount of effort being applied in an exercise program, and enabling different users to compare the results of workouts accomplished with an exercise device equipped with the present invention. Finally, the system should be adaptable to a motor vehicle or the like, permitting an operator thereof not only to adjust the units remotely, but also providing a readout of the settings and resistances of the units to the vehicle operator.

DESCRIPTION OF THE PRIOR ART

U.S. Pat. No. 2,426,447 issued to John N. Gladden et al. on Aug. 26, 1947 discloses a Shock Absorber in which the opposite ends of the inner cylinder are secured to the cylinder by through bolts, rather than by mating threads between head(s) and cylinder. No adjustment means, remote or otherwise, is disclosed.

U.S. Pat. No. 4,796,732 issued to Alan Kong on Jan. 10, 1989 discloses a Piston Cylinder Type Oil Damper having a floating piston disposed at the inner end of a hollow telescoping rod within the outer cylinder. The piston may move away from a corresponding seat to open a passage for free flow of fluid, depending upon compression or extension of the rod. The present invention uses a fixed piston affixed to the end of the rod.

U.S. Pat. No. 4,805,900 issued to William E. Sapp on Feb. 21, 1989 discloses a Strength Training Amusement Device For Simulating Arm Wrestling. The hydraulic unit is not a shock absorber, and has no provision for internal fluid bypass, as in the present invention. Control of fluid pressure is external, rather than being inside the cylinder, as in the present invention. The only readout is of condition selected by the user, rather than providing a continuous readout as in the present invention.

U.S. Pat. No. 4,838,394 issued to Charles D. Lemme et al. on Jun. 13, 1989 discloses an Adjustable Shock Absorber System for vehicles, in which a central pressure source may supply fluid under pressure to each of the four shock absorbers. No means is provided for individual control of each shock absorber, nor is any readout or feedback means provided for the condition of the shock absorbers, as in the present invention.

U.S. Pat. No. 4,919,418 issued to Jan W. Miller on Apr. 24, 1990 discloses a Computerized Drive Mechanism For Exercise, Physical Therapy and Rehabilitation. Although control means are disclosed for the hydraulic device used in the mechanism, the control is external to the hydraulic device rather than being internal, as in the present invention. Accordingly, no internal valving is provided within the cylinder, as in the present invention. Computerized control of only a single hydraulic device is disclosed, unlike the multiple system of the present invention.

U.S. Pat. No. 5,064,031 issued to Shinobu Kakizaki on Nov. 12, 1991 discloses a Motor Operated Actuator With Position Encoder For Stopping Actuator At Desired Position. The motor is formed to fit within a shock absorber strut and provide for the remote adjustment thereof, and is accordingly compactly built. The present invention makes use of external motors for such adjustment in one embodiment, and also for internal electrical adjustment by means of solenoid control. Any motors used with the present invention are external, rather than internal.

U.S. Pat. No. 5,078,241 issued to Norbert Ackermann et al. on Jan. 7, 1992 discloses Controllable Vibration Dampers For Motor Vehicles in which the internal valving comprises flexible discs (e. g., spring washers). With such flexible discs, the greater the pressure differential between the sides of the disc(s), the larger the orifice which will be exposed. With the present invention, the orifice size is fixed, depending upon the adjustment. Moreover, Ackermann et al. fail to provide attachment lugs or eyes at each end of the unit, as are provided by the present invention for ease of attachment.

U.S. Pat. No. 5,097,857 issued to John Mayhew on Mar. 24, 1992 discloses an Electro-Hydraulic Valve-Actuator System intended for the control of a hydraulic ram. Such rams are not shock absorbers, as they have no internal valving, nor is any internal adjustment or pressure transducing means disclosed by Mayhew.

U.S. Pat. No. 5,135,251 issued to Thomas Wormann on Aug. 4, 1992 discloses an Active Oscillation Damping Sensor For Measuring Relative Velocity Between Body And Axle of a vehicle. The sensor comprises external windings disposed at one end of the hydraulic cylinder, around the coaxial piston. The windings produce a voltage as the piston moves therein. No control of internal hydraulic strut palping is disclosed, as provided by the present invention, nor is any specific readout provided by Wormann.

U.S. Pat. No. 5,172,794 issued to Michael Ward on Dec. 22, 1992 discloses an Adjustable Damping Shock Absorber having a chordwise rotary valve in the cylinder thereof, providing for the limited adjustment of compression and rebound fluid flow. The valve has only two passages, thus permitting the valve to be fully closed, or to have one or both passages open. The limited adjustment does not compare with the infinite adjustment permitted by the present invention, nor is any readout of the internal condition or pressure provided by Ward. Moreover, the present invention provides adjustment through the rod of the hydraulic unit, rather than through the side of the cylinder.

U.S. Pat. No. 5,178,160 issued to Serge Gracovetsky et al. on Jan. 12, 1993 discloses an Apparatus For The Rehabilitation And Measurement Of Musculoskeletal Performances. The telescoping struts of the apparatus are pneumatic, and include an external bypass tube and valves, unlike the present internal control valves.

U.S. Pat. No. 5,183,449 issued to Richard J. DeCloux on Feb. 2, 1993 discloses a Die Cast System For Control Of Stairclimbing Exercise Device comprising a pair of hydraulic rams disposed within a unitary casting and communicating with a pair of exercise stair treads. No internal valving is disclosed, as the action of compressing one step/ram causes the other step/ram to raise/extend. Internal bypass palping, in the manner of the present invention, would destroy the direct relationship between the two rams. External adjustment of resistance is provided. While Decloux recognizes that internal compression and friction produce heat and provides means for the dissipation thereof, no means is provided for the measurement of that heat to provide a measure of work output.

U.S. Pat. No. 5,207,300 issued to Walter Engel et al. on May 4, 1993 discloses a Hydraulic, Adjustable Vibration Damper For Motor Vehicles. An axial passageway is provided in the rod portion for pneumatic control of an internal bypass valve. This valve does not serve as the main metering valve, as does the adjustable internal valve of the present invention, but rather as a bypass for the primary compression and rebound valves which are located at opposite ends of the piston in the Engel et al. device. As the pneumatic passageway is purely axial, no means is provided for coaxially disposed installation lugs or eyes, as in the present invention.

Finally, U.S. Pat. No. 5,207,621 issued to Steven L. Koch et al. on May 4, 1993 discloses a Stair Climbing Exercise Machine in which the two hydraulic devices may operate independently. The devices are hydraulic rams, however, and not shock absorber type devices with internal passages between the cylinder ends, as in the present invention. All fluid control valves and circuitry are disposed externally, rather than the internal valving of the present invention.

None of the above noted patents, taken either singly or in combination, are seen to disclose the specific arrangement of concepts disclosed by the present invention.

SUMMARY OF THE INVENTION

By the present invention, an improved hydraulic control system is disclosed.

Accordingly, one of the objects of the present invention is to provide an improved hydraulic control system which is adaptable to vehicle suspension systems, exercise devices, and other mechanisms.

Another of the objects of the present invention is to provide an improved hydraulic control system which includes internal control valving providing for the adjustment of compression and rebound resistance.

Yet another of the objects of the present invention is to provide an improved hydraulic control system which provides for the remote control of such internal valving by various means, including pneumatic, mechanical, and electrical.

Still another of the objects of the present invention is to provide an improved hydraulic control system which may provide for the remote control of a single hydraulic cylinder, for control of plural cylinders by means of a single central control, or for independent control of plural cylinders by means of individual controls.

A further object of the present invention is to provide an improved hydraulic control system which provides for different types of primary and bypass valving within the cylinder(s) of the system.

An additional object of the present invention is to provide an improved hydraulic control system which provides information on the working condition of the cylinder(s) of the system.

Another object of the present invention is to provide an improved hydraulic control system which may provide such information for a single cylinder, or a plurality of identically set cylinders having a single readout means, or for a plurality of cylinders each having its own readout means.

Yet another object of the present invention is to provide an improved hydraulic control system which provides for different types of readout means, including internal temperature and pressure.

Still another object of the present invention is to provide an improved hydraulic control system which remote internal valve adjustment means communicates with the internal valving by means of an axial passage through the rod of each of the cylinders.

A final object of the present invention is to provide an improved hydraulic control system for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the figures of the attached drawings.

DETAILED DESCRIPTION OF THE PREFERRED EMBODIMENTS

Referring now to the drawings, the present invention will be seen to relate to a hydraulic control system including one or more hydraulic cylinder assemblies or devices, means for the internal control of resistance of such cylinders or devices, and readout means for quantifying the force being applied to such cylinders. It will be understood that, while generally the cylinder assemblies or devices may use hydraulic or other essentially incompressible fluid as the working fluid, that the present invention is equally adaptable to pneumatic cylinders, and the control system of the present invention may make use of either an incompressible hydraulic fluid or compressible gas for pneumatic operation.

Figure 1:
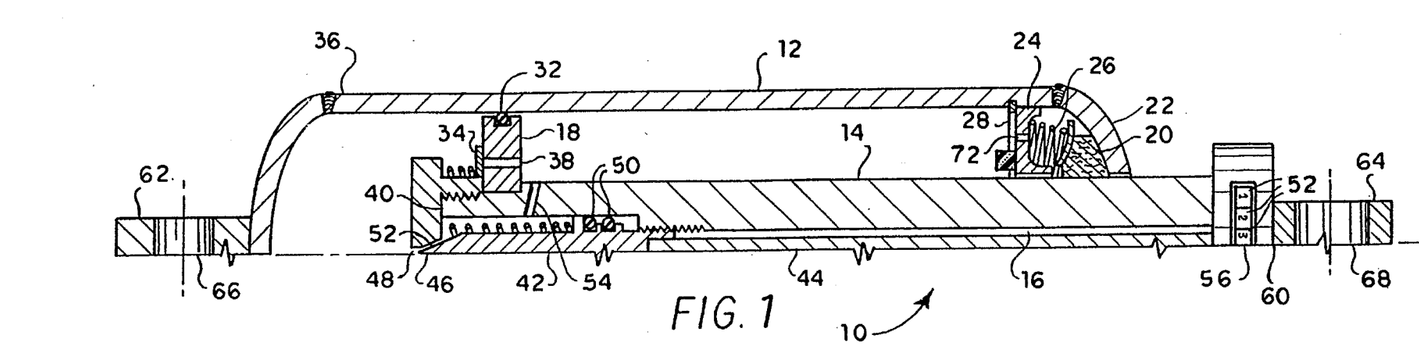
FIG. 1 is a side view in section of a first embodiment of a hydraulic cylinder of the present invention, it being understood that only half of the article is shown due to its axial symmetrical nature.
Figure 2:
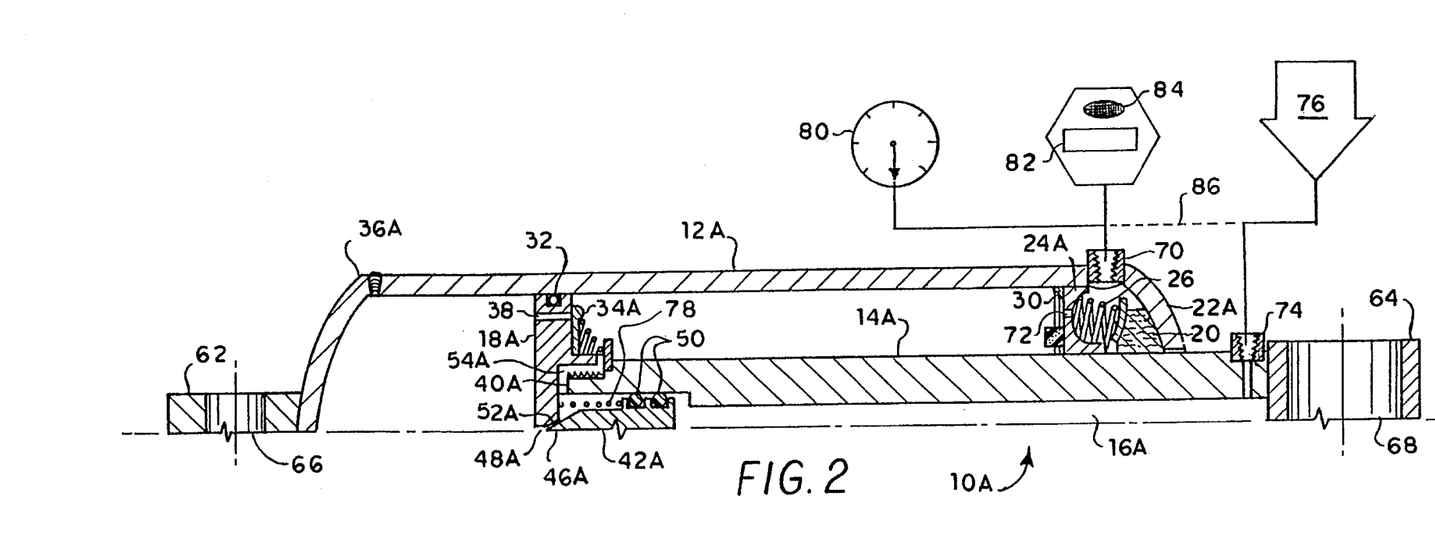
FIG. 2 is a side view in section of a second embodiment, with the article again being shown in half section.

FIG. 1 provides a cross sectional view of a hydraulic device 10 of the present invention, with one side of the view not shown due to the axially symmetrical nature of the device. The hydraulic cylinder or strut assembly 10 generally comprises an outer cylinder 12, a hollow inner rod 14 having a concentric, coaxial passage 16 therethrough, and a piston 18 secured to the end of the rod 14 disposed within the cylinder 12. A seal or packing 20 is installed about the rod 14 within the rod extension end 22 of the cylinder 12, and is retained by a packing retainer/rod guide 24 and packing spring 26. The packing retainer/guide 24 is in turn secured by an internal C ring 28. (Alternatively, the retainer/guide 24 may be secured by a weld 30, as shown in FIG. 2, or other means.)

The piston 18 includes at least one circumferential seal 32 (O-ring, etc.) thereabout, and may include one or more bypass valves therein. The piston 18 of FIG. 1 includes a spring biased rebound bypass valve 34, which provides for fluid flow from the rod end 22 to the attachment end 36 within the cylinder 12 by means of one or more passages 38 through the piston 18, as the rod 14 is pulled rapidly from the cylinder 12.

Normally, fluid will flow through the adjustable valve disposed within the piston attachment end 40 of the rod 14 and discussed further below. However, the bypass valve(s), e. g., valve 34, may act as a safety valve in the event the rod is extended, or in the case of a compression bypass valve, compressed, too rapidly, if a sufficiently strong bypass valve spring is installed. Such bypass valves will find their optimum use in such hydraulic devices 10 as installed in vehicle suspension systems and other devices where mechanical forces may be relatively high.

In some cases (e. g., rowing machines) it is desirable to provide relatively high resistance in one direction of travel, and relatively low (or practically no) resistance in the opposite direction. The present invention provides for such by providing a variable resistance compression stroke, with a relatively low resistance rebound bypass valve, as in the device 10 of FIG. 1. Alternatively, a relatively low resistance compression bypass valve may be provided, as in the valve 34a of FIG. 2, with the rebound being variably adjustable by external means. The various types of variable resistance internal valves may provide for the variable control of both compression and rebound, with either the compression or rebound stroke forces being substantially reduced by means of a compression valve 34a (FIG. 2) or rebound bypass valve 34 (FIG. 1), as required and depending upon the specific application for the unit.

The primary valving for hydraulic assembly 10 comprises a needle valve 42 which is secured to the internal end of a shaft 44. The tip 46 of the valve 42 cooperates with a primary passage 48 through the center of the piston 18. The attachment end of the needle valve 42 is threaded into the inside of the passage 16 of the rod 14; thus, as the needle valve 42 is turned, it is advanced toward or away from the passage 48 to open or close the gap 52 between the needle valve tip 46 and the valve seat comprising the wall of the valve passage 48. The valve 42 is sealed by means of O-rings 50 or the like, with fluid passing through the gap 52 and entering the rod extension end 22 of the cylinder 12 by means of one or more rod passages 54.

The needle valve 42 is threadedly advanced or withdrawn from the primary passage 48 by means of the concentric shaft 44, which extends through the rod passage 16 to a rotary dial 56 adjacent the structure attachment end 60 of the rod 14. The dial 56 may include numbers 58 or other markings to indicate the adjustment positions available. Assuming no detents are provided for the dial 56, the range of settings for the valve 42 is practically infinite.

Attachment for the above hydraulic strut assembly 10 is provided by a cylinder attachment lug 62 extending coaxially from the attachment end 36 of the cylinder 12, and a rod attachment lug 64 extending coaxially from the structure attachment end 60 of the rod 14. The lugs 62 and 64 respectively include eyes or passages 66 and 68 therethrough, providing for the passage of a pivotal attachment bolt or pin (not shown) therethrough. Other means may be provided for securing the cylinder and rod ends of the present hydraulic assembly, if desired.

FIG. 2 provides a cross sectional view of a second embodiment of the hydraulic assembly of the present invention, with the assembly of FIG. 2 indicated as 10a. The primary differences between the assemblies 10 of FIG. 1 and 10a of FIG. 2 are in the control means for the internal primary valving, the bypass valving, and additional ports provided in the cylinder and rod walls, as described below.

The cylinder 12a includes a port 70 in the rod extension end 22a thereof, which port communicates with the internal volume of the cylinder 12a. (The port 70 is shown above the packing retainer and guide 24a, but it will be noted that there is a drain passage 72 through the packing retainer/guide 24a to allow fluid flow therethrough, as in FIG. 1 also.) Other components in the rod extension end 22a of the hydraulic assembly 10a are identical to those of the assembly 10 of FIG. 1, discussed above.

The assembly 10a includes a hollow rod 14a having a coaxial passage 16a therethrough, similar to the internal rod 14 of the assembly 10 of FIG. 1, but differing in various details to provide for differences in internal valve operation, as discussed below. The piston attachment end 40a of the rod 14a includes a valve 42a therein, which cooperates with a central passage 48a in the piston 18a, similarly to the arrangement of the assembly 10 of FIG. 1. However, it will be seen that the valve 42a is not threaded, and is not directly connected to any mechanical component for control.

Further, there is no central shaft or other component within the coaxial rod passage 16a. However, the structure attachment end of the rod 14a includes a lateral port 74, which port 74 communicates with the passage 16a. By providing a pressurized fluid (e.g., a compressible gas such as air, nitrogen, etc., or an incompressible liquid such as hydraulic fluid or oil, etc.) from a pressurized fluid source 76 (pressurized tank and/or pump, etc.), the valve 42a will be displaced against the opening spring 78 to close off the gap 52a between the needle seat, thereby controlling the fluid flowing through the gap 52a according to the pressure supplied within the central passage 16a of the rod 14a. Thus, the greater the pressure supplied from the source 76 to the coaxial rod passage 16a, the further the valve 42a will be urged toward the piston passage 48a to close off the gap 52a, thereby to produce greater compression and rebound resistance in the assembly 10.

It will be noted that the use of a compressible fluid (gas) for the pressurization of the passage 16a and valve 42a provides a variable width for the gap 52a, depending upon the viscosity of the fluid used in the assembly 10a and the speed of actuation of the assembly 10a, particularly in compression. Rapid compression and/or relatively high viscosity fluids will tend to create relatively high pressures within the cylinder attachment end 36a, thus forcing the valve 42a open against any fluid pressure within the concentric rod passage 16a. While such an action may be desirable under some circumstances, a consistent opening of the valve 42a may be achieved by using an incompressible liquid (e. g. hydraulic fluid) for the positioning of the valve 42a, if desired.

The hydraulic assembly 10a of FIG. 2 also provides a compression bypass valve 34a on the piston 18a, in the manner of the rebound bypass valve 34 of FIG. 1. As the valve 34a is installed on the opposite side of the piston 18a from the valve 34 of FIG. 1, it will be operable only in compression, in the event that the assembly 10a is compressed with extreme rapidity and/or the fluid therein is of extremely high viscosity. Under such circumstances, the valve 42a would likely open further to relieve such pressure within the cylinder attachment end 36a of the assembly 10a, but in the event that an incompressible liquid is used for the pressurization of the valve 42a, such a compression bypass may be required. The valves 42 and 42a are interchangeable to either side of the piston 18 or 18a, as desired.

Other features of the hydraulic assembly 10a (e. g., attachment lugs 62 and 64, etc.) will be seen to be identical to those of the assembly 10 of FIG. 1. However, the port 70 communicating with the rod extension side 22a of the cylinder 12a provides for the attachment of various devices and transducers, generally known as "readouts", whether visual or aural. As the rod 14/14a is exercised within a cylinder 12/12a, the pressure within the cylinder and to either side of the piston 18/18a will vary, depending upon the degree of opening of the valve 42/42a and any opening of a relief valve 34/34a. This variation in pressure may be transmitted to any one of a number of devices to provide a readout of the pressure or other related condition within the cylinder, and the force being developed in the compression or extension of the rod which produces such pressure.

In FIG. 2, the attachment of an analog pressure gauge 80 to the port 70 is shown, which gauge 80 may provide a direct readout of the working pressure within the rod extension end 22a of the cylinder 12a. Alternatively, a digital gauge 82 providing pressure and/or temperature readouts may be provided. As the pressure within the assembly 10/10a increases, so does the temperature, due to the compression of any compressible fluids/gasses (if any) within the cylinder, and also due to internal friction of the fluid. Such a temperature readout may be calibrated to provide an indirect measure of the force being applied to the assembly 10/10a. It is also possible to interface the digital signals provided by an analog-to-digital signal processor with a voice synthesizer 84, to provide an aural readout of the internal conditions of the hydraulic assembly 10a. This is advantageous for situations in which a user cannot conveniently visually refer to a gauge.

The port 70 may also provide for the optional connection of a pressurized fluid source 76, as shown by means of an optional connection line 86 in FIG. 2. Such pressure (properly regulated) can serve to reduce noise, vibration and chatter of valves, springs, and other components within the assembly 10a. It will be understood that any of the features of the assembly 10a (e.g., the cylinder port 70, hydraulic or pneumatic control of the valve 42a, and/or provision of the compression relief valve 34a instead of or in addition to the rebound relief valve 34 of hydraulic assembly 10, may be incorporated within the assembly 10, with appropriate modifications as required. In a like manner, such features of the assembly 10 of FIG. 1 may be incorporated within the hydraulic assembly 10a of FIG. 2, if desired.

Figure 3:
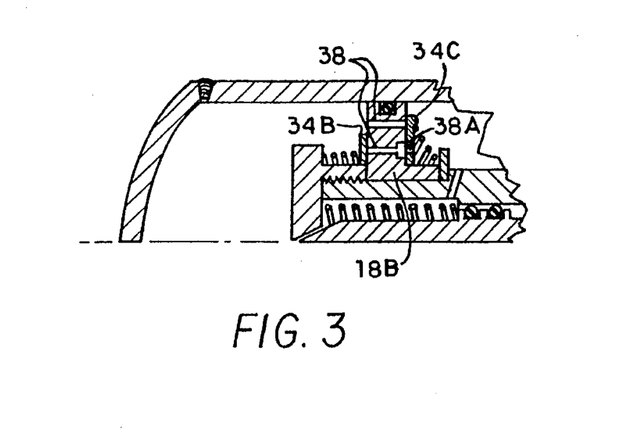
FIG. 3 is a broken away side view in section of an alternate primary and relief valve mechanism adaptable to the hydraulic cylinders of the present invention.
Figure 4:
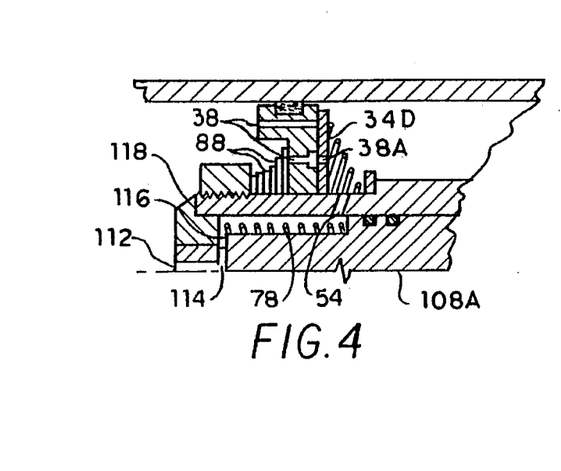
FIG. 4 is a broken away side view in section of another alternate primary and secondary relief valve mechanism.

FIGS. 3 and 4 disclose different relief valve means adaptable to any of the hydraulic assemblies of the present invention. The piston 18b of FIG. 3 includes both a rebound relief valve 34b and a compression relief valve 34c. Relief valve ports 38 provide for passage of fluid through the piston 18b when their respective valves 34b or 34c are opened. In order to provide for flow from the rod extension end of the cylinder to the attachment end 36b when the assembly is in rebound mode and the rebound relief valve 34b is opened, another port 38a is provided through the compression relief valve 34c. Alternatively, the two valves 34b and 34c may be radially displaced about the piston 18b to preclude the requirement for a secondary passage 38a through one of the valves.

Figure 5:
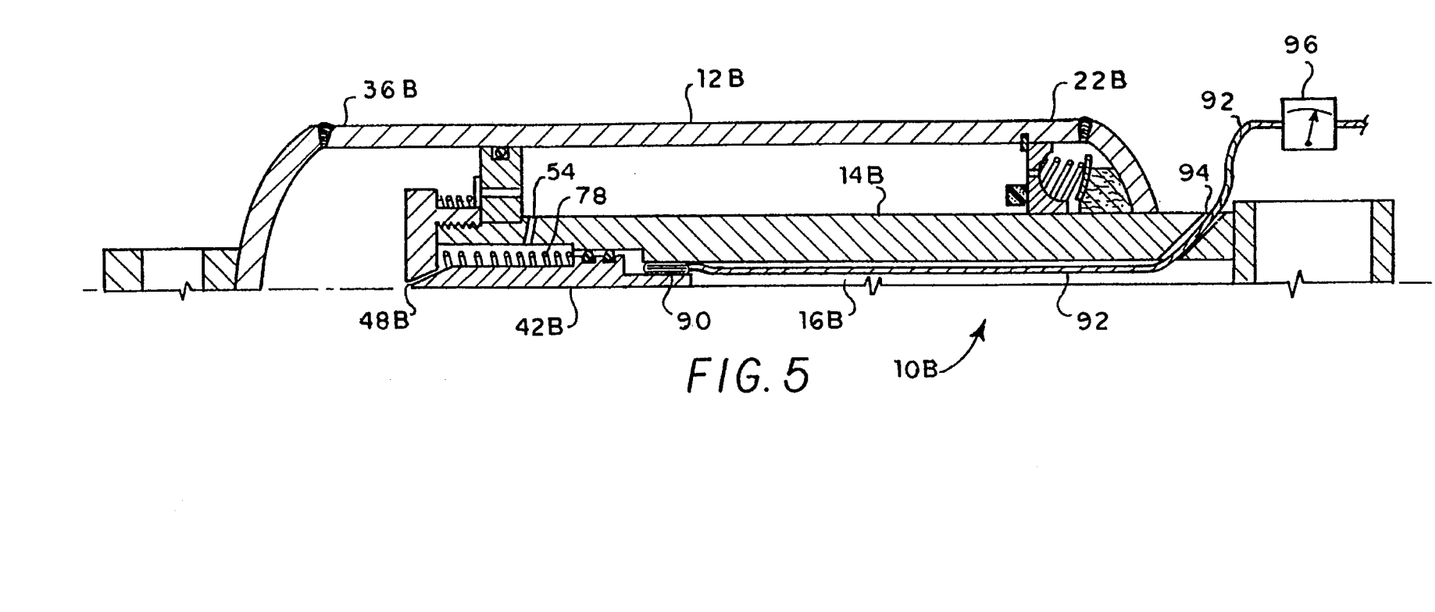
FIG. 5 is a side view in section of another embodiment of the present invention, again in half section, showing an alternative means for control of the internal valving.

FIG. 4 discloses another dual relief valve configuration, with a compression relief valve 34d (similar to the compression relief valves 34a and 34c discussed above) and a rebound relief valve comprising one or more resilient leaves 88. While coil springs are shown in FIGS. 1, 3, and 5 to provide closure force for the relief valves, the use of resilient, flat and planar material to provide spring means also allows at least the base leaf to act as the closure means for the valve, thus simplifying the valve construction. While plural leaves 88 are shown in the rebound relief valve of FIG. 4, a single leaf or relatively few leaves may be used as required to provide the needed closure force.

FIG. 5 discloses a further embodiment of a hydraulic device or assembly 10b. In this embodiment, the valve 42b is electrically actuated, by means of a solenoid 90 (a cross section of the windings or coils is shown). An electric cable 92 extends from the solenoid 90 through the coaxial passage 16b of the rod 14b and outward through an obliquely angled lateral passage 94, to a controller 96 which serves to control the electrical power supplied to the solenoid 90 and thus the electromagnetic force which drives the valve 42b. As more power is supplied to the solenoid 90, the electromagnetic force developed will increase to drive the valve 42b against the coiled valve spring 78 to close the central valve passage 48b. As electrical power is reduced, the spring 78 will urge the valve 42b away from the passage 48b, thus allowing greater fluid flow through the passage from the attachment end 36b to the rod extension end 22b of the cylinder 12b, via the rod passage 54, as in the hydraulic device 10 of FIG. 1. As in the case of the mechanical dial control 56 of FIG. 1 and the pneumatic control of FIG. 2, the controlling means for each of the hydraulic devices 10 through 10b are externally located and remote from the internal valve being controlled.

Figure 6:
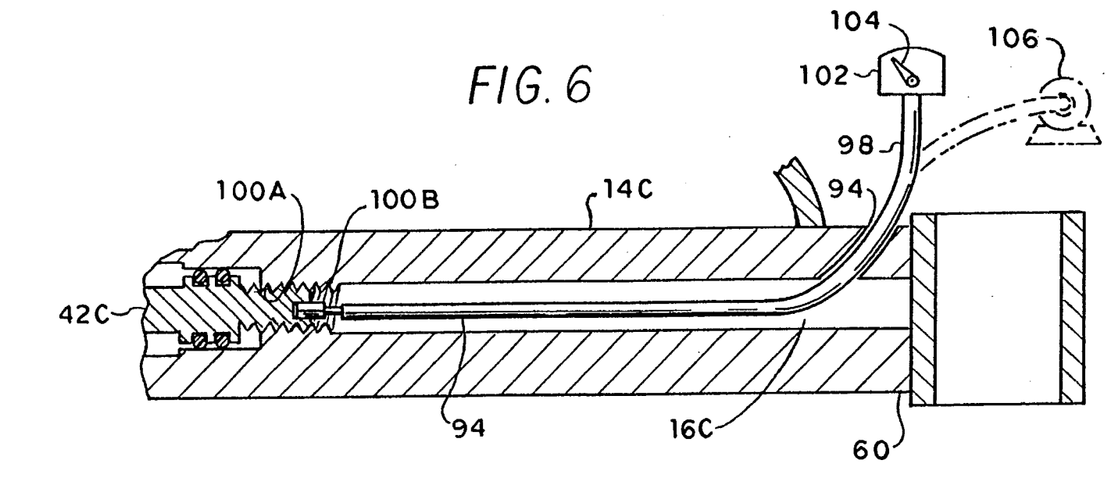
FIG. 6 is a broken away side view in section of a piston rod of the present invention, showing alternative means for the control of the internal valving of the hydraulic device.

Yet another embodiment is disclosed in FIG. 6, wherein a mechanical cable 98 is provided to advance and retract the valve 42c (shown with the end portion broken away) relative to the rod 14c, and thus a piston (not shown) secured to the end of the rod 14c. The inner walls of the coaxial passage 16c within the rod 14c, and adjacent the valve 42c, are provided with female threads 100a, with the mating portion of the valve 42c equipped with male threads 100b, in the manner of the threaded arrangement shown (but not numbered) for the inner rod and central valve of FIG. 1. The internal end of the cable 98 is secured to the valve 42c by a mating fitting (e.g., square drive, etc.) and exits the rod 14c by an obliquely angled lateral passage 94 through the side of the rod 14c and adjacent the rod structure attachment end 60 of the rod 14c. (The obliquely angled lateral rod passage 94 permits the mechanical cable 98 to exit the rod 14c with a maximum radius, thus reducing potential binding forces within the cable sheath.) The opposite, external end of the cable 98 is connected to a dial 102, which may be used to turn the cable 98 to threadedly advance or retract the valve 42c relative to its respective piston orifice (not shown in FIG. 6, but similar to that shown in FIGS. 1 through 3 and/or 4, and 5). An indicator 104 may be provided to indicate the number of revolutions of the cable 98, and thus the position of the valve 42c relative to the piston passage or orifice. The result is similar to the mechanical adjustment means disclosed in FIG. 1 and discussed above, except that the valve advance and retraction is operated by an external dial remotely located by means of a flexible cable, rather than an external dial remotely positioned at another location on the hydraulic device.

Alternatively, a motor 106 (e. g., stepper motor or other suitable motor) may be used to rotate the cable 98 and control the opening of the valve 42c, if desired. The result will be seen to be much the same as with the manually operated dial 102, except that the motorized embodiment will be seen to operate much faster when desired. In addition, a motorized actuation may be combined with a pressure or temperature transducer, as in FIG. 2, to provide automated control of such a motor controlled hydraulic device. This may be quite valuable in some applications of the device, e. g., vehicle suspension systems.

Figure 7A:
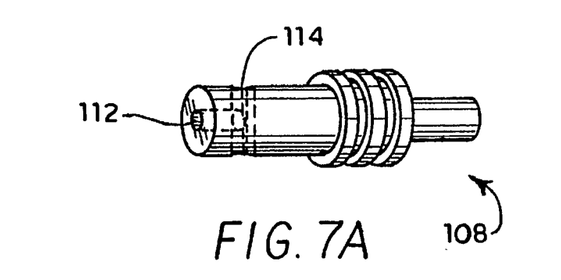
FIG. 7A is a perspective view of a spool valve, providing an alternate internal control valve for the present hydraulic device.
Figure 7B:
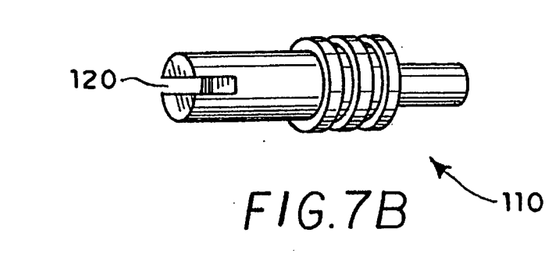
FIG. 7B is a perspective view of an alternate type of spool valve.

FIGS. 7A and 7B disclose alternative valve configurations which may be adapted to the present invention in combination with a properly configured piston passage or orifice. The valves of FIGS. 1 through 3 and 5 are needle type valves, with a tapered tip cooperating with a conically shaped central orifice in the piston. The valves 108 and 110 respectively of FIGS. 7A and 7B are spool valves, which may be advantageous in providing greater linearity of action during advance and retraction, particularly when threaded as in the spool valve 108a shown in partial cross section in FIG. 4. The uniform advancement or retraction per each turn of such a valve, due to the thread pitch of the mating threads 100a and 100b, results in an extremely linear rate of change of flow for a given fluid pressure and viscosity, particularly if the lateral passage is squared, as shown in FIGS. 7A and 7B. (While no threads are shown with the spool valves 108 and 110 respectively of FIGS. 7A and 7B, it will be understood that these valves may be provided with threads, as shown in FIG. 6.)

The spool valves 108a and 108 respectively of FIGS. 4 and 7A each include a concentric passage 112, which communicate with a rectangular lateral passage 114; a cross section of this configuration is shown in the spool valve 108a of FIG. 4. The lateral rectangular passage 114 in turn communicates with a lateral rod passage 54 by means of the generally cylindrical space provided for the valve spring 78, between the side of the valve 108a and the valve receptacle in the end of the rod.

While the spool valve 108 of FIG. 7A is of uniform diameter from the passage end to the circumferential O-ring retaining rings, such a valve may be alternatively configured with a shoulder 116, as shown in the valve 108a of FIG. 4. In FIG. 4, the valve 108a is closed when the shoulder 116 contacts the opposed face of the valve seat 118, whereas the uniform diameter of the valves 108 and 110 allow them to advance within the seat 118, past the lateral passage 114 (or base of the slot 120, in the case of the spool valve 110), to close off flow through the lateral passage 114 of valve 108 or slot 120 of valve 110. It will be seen that any of the hydraulic devices of the present invention may be configured to use spool valves such as the valves 108, 108a, or 110, if desired, rather than needle valves. Alternatively, a needle valve equipped hydraulic device may be configured to operate with a spool valve, with the proper valve seat configuration.

The above hydraulic devices have been described as single devices, separate from any other like devices. Any controls or readouts have been dedicated to the single device described, rather than being connected to a plurality of such devices. However, with the proper hydraulic or pneumatic circuitry, such devices may be interconnected and their performance controlled or determined accordingly, as discussed further below and referring to FIGS. 8A and 8B.

Figure 8A:
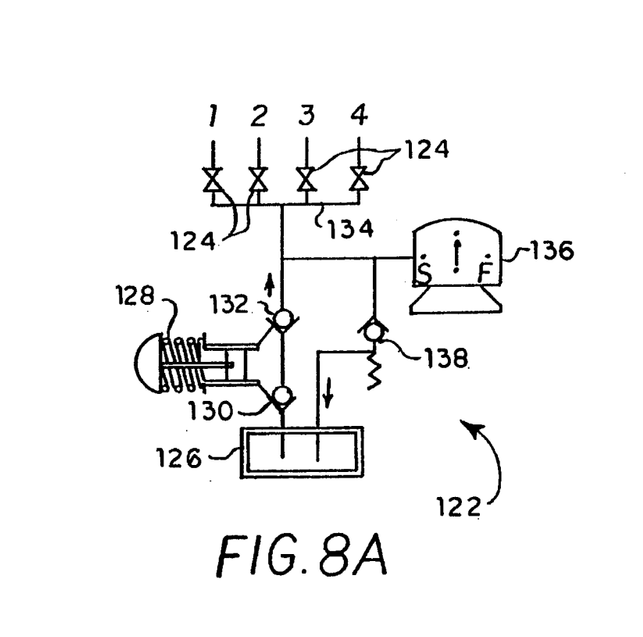
FIG. 8A is a schematic diagram of a readout means for determining the working condition of a single cylinder.

FIG. 8A discloses a fluid (pneumatic or hydraulic) circuit diagram providing for the control of a plurality of four hydraulic devices of the present invention, indicated as 1, 2, 3, and 4. Each of the hydraulic devices 1 through 4 is connected to a central circuit 122 by a dedicated valve 124; a hydraulic or pneumatic tank or reservoir 126 is provided for fluid for the circuit 122 and devices 1 through 4. A compressor, schematically shown as 128 in FIG. 8A, draws fluid from the reservoir and supplies that fluid under pressure to the circuit 122; the compressor may be a pressurized container, manual or powered pump, etc., as desired.

The compressor 128 is restricted to supplying fluid in only one direction in the system, as indicated by the arrows, due to the inlet and outlet check valves represented schematically as 130 and 132. (These check valves may be identical and may be incorporated with the compressor or pump 128, but control the function of the circuit or system 122 by their position and orientation in the system relative to the compressor 128. The "V" portion of each of the valves represents the valve seat, with the ball representing the closure means for the seat. Thus, fluid may flow from the seat to force the ball of the valve open, but cannot flow in the opposite direction, past the ball and into or through the seat.) Once past the outlet valve 132, the fluid is directed to a manifold 134, which in turn supplies the hydraulic devices 1 through 4 through the valves 124, and also provides pressure to a gauge 136. (Any of the devices 80, 82, and/or 84 of FIG. 2 may be used or substituted for the gauge 136 of FIG. 8A.) Return flow from the hydraulic devices 1 through 4 and gauge 136 passes through an adjustable check valve 138, permitting adjustment of the pressure in the system, and thence back to the reservoir 126.

Actuation of the compressor 128 in the above described circuit provides for the collective remotely adjustable control of the internal valving in hydraulic devices such as the device 10a of FIG. 2. It will be seen that an analogous electrical circuit may be provided, using an electrical source in place of the tank or reservoir 126, a transformer and/or rectifier for the pump 130, and diodes for the various check valves in the system. Such an electrical circuit may be used to control the electrically or electromechanically actuated adjustable valves of the hydraulic devices of FIGS. 5 and 6.

In other applications, it may be desirable to provide separate, individual control for plural hydraulic devices in a single system. This may be accomplished by means of the circuit 140 of FIG. 8B. A single, central source, reservoir or tank 126a, similar to the tank or reservoir 126 of FIG. 8A, provides the fluid (again, a compressible gas, e.g., dry nitrogen, etc., or alternatively a hydraulic fluid) for the circuit 140. A compressor 128a, similar to that of FIG. 8A, provides pressure for the circuit 140, drawing from the reservoir 126a in the case of a non-atmospheric gas, and distributes the fluid or gas to a manifold 134a. An inlet check valve 130a restricts flow to the direction indicated by the arrows, from the tank 126a to the compressor or pump 128a, thence to the manifold 134a.

Figure 8B:
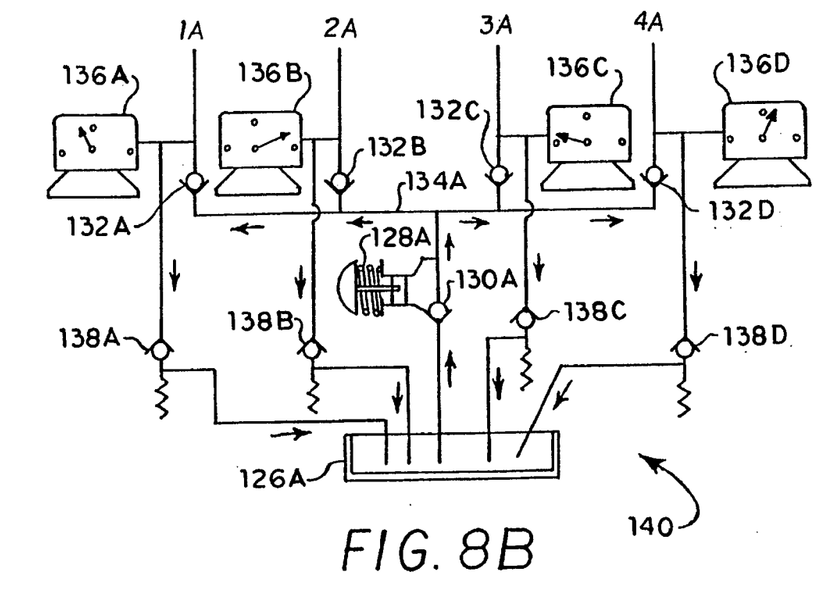
FIG. 8B is a schematic diagram of a hydraulic system comprising plural cylinders, each having its own independent readout means.

At this point, the fluid is divided to pass through a plurality of individual check valves 132a, 132b, 132c, and 132d, corresponding to the outlet check valve 132 of FIG. 8A. As the circuit 140 of FIG. 8B provides for individual control of plural hydraulic devices, e. g. the devices 1a through 4a of FIG. 8B, it will be seen that the pressure within the control circuit for each individual device 1a through 4a may differ. Thus, separate check valves 132a through 132d are required to prevent differential pressure transfer from one hydraulic device to another through the manifold 134a.

Once pressure has been distributed through the individual check valves 132a through 132d, respectively corresponding to the hydraulic devices 1a through 4a, it goes on to pressurize the internal passage and valve of the devices, e. g., the hydraulic device 10a of FIG. 2. At this point, the pressure in each of the devices 1a through 4a would be identical (assuming no transient internal changes in condition due to movement of the devices), and the simpler circuit 122 of FIG. 8A could be used for collective control of the devices. However, additional individual plural adjustable check or pressure relief valves 138a through 138d are provided for the circuit 140, with each of the valves 138a through 138d respectively controlling the individual pressure in the devices 1a through 4a. Thus, when the adjustable valves 138a through 138d are adjusted differently, it will be seen that different pressures will be maintained within each portion of the system 140 between the pump outlet check valves 132a through 132d and their corresponding adjustable relief valves 138a through 138d, including the pneumatically adjustable hydraulic devices 1a through 4a. The hydraulic devices 1a through 4a will respond accordingly, by providing more or less restriction to the internal valving depending upon the internal pneumatic pressure provided.

Gauges 136a through 136d, corresponding respectively to the devices 1a through 4a, provide a readout of the internal pressure or other parameter of each of the individual hydraulic devices 1a through 4a. Again, other readout devices may be used, as desired. It will be noted in FIG. 8B that each of the gauges 136a through 136d shows a different indication, with gauge 136a indicating approximately 40% of scale, gauge 136b showing about 80% of scale, and gauges 136c and 136d each respectively indicating about 10% and 60% of scale. These readouts will be seen to be dependent upon the pressures in the corresponding parts of the system 140, which pressures are in turn dependent upon the settings of the respective adjustable valves 138a through 138d and the corresponding internal pneumatic valve settings of the hydraulic devices 1a through 4a. (While normally such wide variation in pressures might not be expected or desired, the point of the circuit 140 of FIG. 8B is to allow variation in the pressure for each of the devices 1a through 4a, and to show such variation by means of the different indications of the gauges 136a through 136d.)

The various embodiments of the above discussed hydraulic devices and control systems therefor will be seen to provide various alternatives for telescoping hydraulic struts, shock absorbers and the like having externally remotely controllable adjustment of the internal compression and/or rebound resistance of such devices, and systems for collectively or individually controlling such devices. The present invention is adaptable to exercise machines of various configurations, and may be adapted to motor vehicles to provide remote collective or individual adjustment of the resistance at each wheel, in order to compensate for conditions. The versatility and cost effectiveness of the present invention provide numerous advantages over the prior art.

It is to be understood that the present invention is not limited to the sole embodiment described above, but encompasses any and all embodiments within the scope of the following claims.

I claim:

1. A hydraulic control system including:

at least one extendible and retractable hydraulic device comprising a cylinder having opposite attachment and rod extension ends, a piston having a valve passage passing therethrough, said piston disposed within said cylinder, and a hollow telescoping rod having a piston attachment end disposed within said cylinder and connected to said piston and an opposite structure attachment end extending from said rod extension end of said cylinder, with said hollow rod having a concentric passage therethrough and a radial passage in communication with said concentric passage, said radial passage adjacent said structure attachment end, and;

said hydraulic device including at least one internal flow resistance adjustment means comprising a valve threadedly disposed within said piston attachment end of said rod, said valve communicating with said valve passage passing through said piston, and said hydraulic control system including at least one mechanical adjustment control means comprising a selectively rotatable cable connected to said valve, said cable passing through said concentric passage and said radial passage of said rod, whereby;

said valve is externally and remotely adjustable by selective rotation of said cable, causing said valve to be threadedly advanced and retracted to close and open said valve passage passing through said piston, thereby adjusting the working resistance and characteristics of said at least one hydraulic device.

2. The hydraulic control system of claim 1 wherein:

said internal flow resistance adjustment means comprises a needle valve.

3. The hydraulic control system of claim 1 wherein:

said internal flow resistance adjustment means comprises a spool valve.

4. The hydraulic control system of claim 1 wherein:

said rotatable cable is manually operated.

5. The hydraulic control system of claim 1 wherein:

said rotatable cable is motorized.

6. The hydraulic control system of claim 1 wherein:

said piston includes at least one bypass valve.

7. The hydraulic control system of claim 6 wherein:

said at least one bypass valve comprises at least a compression bypass valve.

8. The hydraulic control system of claim 6 wherein:

said at least one bypass valve comprises at least a rebound bypass valve.

9. The hydraulic control system of claim 1 wherein:

said cylinder attachment end includes an axially concentric cylinder attachment lug extending therefrom, with said cylinder attachment lug having an attachment eye passing laterally therethrough, and;

said structure attachment end of said rod includes an axially concentric rod attachment lug extending therefrom, with said rod attachment lug having an attachment eye passing laterally therethrough.

10. The hydraulic control system of claim 1 including:

readout means providing information relating to the internal working resistance and characteristics of said at least one hydraulic device and force being applied to said at least one hydraulic device.

11. The hydraulic control system of claim 10 wherein:

said cylinder includes a lateral passage adjacent said attachment end, and said readout means comprises a pressure gauge connected to said cylinder lateral passage, whereby a user of said system may read said pressure gauge to determine the amount of force applied to said at least one hydraulic device.

12. The hydraulic control system of claim 10 wherein:

said cylinder includes a lateral passage adjacent said attachment end, and said readout means comprises a temperature gauge connected to said cylinder lateral passage, whereby a user of said system may read said temperature gauge to determine the temperature rise within said cylinder due to internal friction and pressure produced according to the amount of force applied to said at least one hydraulic device.

\* \* \* \* \*